United States Patent
Sartori et al.

(10) Patent No.: US 8,891,545 B2
(45) Date of Patent: Nov. 18, 2014

(54) SYSTEM AND METHOD FOR A THIN-CLIENT TERMINAL SYSTEM SUPPORTING USB DEVICES

(75) Inventors: Gabriele Sartori, Fremont, CA (US); Subir Ghosh, San Jose, CA (US); Nikolay Kovach, Taganrog (RU)

(73) Assignee: nComputing Inc., Santa Clara, CA (US)

( * ) Notice: Subject to any disclaimer, the term of this patent is extended or adjusted under 35 U.S.C. 154(b) by 136 days.

(21) Appl. No.: 13/499,545

(22) PCT Filed: Oct. 1, 2010

(86) PCT No.: PCT/US2010/051204
§ 371 (c)(1),
(2), (4) Date: Jun. 5, 2012

(87) PCT Pub. No.: WO2011/041734
PCT Pub. Date: Apr. 7, 2011

(65) Prior Publication Data
US 2012/0229703 A1    Sep. 13, 2012

Related U.S. Application Data (60) Provisional application No. 61/248,315, filed on Oct. 2, 2009.

(51) Int. Cl.
*H04L 12/28* (2006.01)
*G09G 5/12* (2006.01)
*H04N 7/083* (2006.01)

(52) U.S. Cl.
CPC *G09G 5/12* (2013.01); *H04N 7/083* (2013.01); *G09G 2370/022* (2013.01)
USPC ............................ 370/419; 709/203; 709/231

(58) Field of Classification Search
CPC .... G09G 5/12; G09G 2370/022; H04N 7/083
USPC .................... 370/419; 709/203, 231; 348/482
See application file for complete search history.

(56) References Cited

U.S. PATENT DOCUMENTS

| | | | |
|---|---|---|---|
| 6,195,797 | B1 | 2/2001 | Williams, Jr. |
| 6,944,826 | B2 | 9/2005 | Thornton |
| 2001/0056464 | A1* | 12/2001 | Ishihara et al. ............... 709/203 |
| 2006/0285012 | A1* | 12/2006 | Ejima et al. ................... 348/482 |
| 2007/0268824 | A1 | 11/2007 | Kodaka et al. |
| 2009/0300205 | A1* | 12/2009 | Jabri ............................. 709/231 |
| 2010/0332702 | A1* | 12/2010 | Wu et al. ......................... 710/73 |
| 2011/0064149 | A1* | 3/2011 | Ejima ..................... 375/240.28 |

OTHER PUBLICATIONS

"International Application Serial No. PCT/US2010/51204, Search Report mailed Nov. 23, 2010", 4 pgs.

(Continued)

*Primary Examiner* — Albert T Chou
(74) *Attorney, Agent, or Firm* — Schwegman Lundberg & Woessner, P.A.

(57) ABSTRACT

Thin-client terminal systems allow computer systems to be shared by multiple computer users. With modern technology, the cost of implementing a thin-client terminal system can be very low. To improve thin-client terminal systems, a thin-client terminal system accepts user input data in a first serial interface format and transcodes the user input data into a second serial interface format for transmission to a server.

29 Claims, 9 Drawing Sheets

(56) References Cited

OTHER PUBLICATIONS

"International Application Serial No. PCT/US2010/51204, Written Opinion mailed Nov. 23, 2010", 10 pgs.

International Application Serial No. PCT/US2010/051204, International Preliminary Report on Patentability mailed Apr. 12, 2012, 7 pgs.

* cited by examiner

SYSTEM AND METHOD FOR A THIN-CLIENT TERMINAL SYSTEM SUPPORTING USB DEVICES

CROSS-REFERENCE TO RELATED APPLICATIONS

This application is a U.S. National Stage Filing under 35 U.S.C. 371 from International Patent Application Serial No. PCT/US2010/051204, filed Oct. 1, 2010, and published on Apr. 7, 2011 as WO 2011/041734 A1, which claims the benefit of the filing date of U.S. provisional application Ser. No. 61/248,315, filed Oct. 2, 2009, and entitled "SYSTEM AND METHOD FOR A THIN-CLIENT TERMINAL SYSTEM SUPPORTING USB DEVICES," the contents of which are incorporated herein by reference in their entirety.

TECHNICAL FIELD

The present invention relates to the fields of terminal systems. In particular, but not by way of limitation, the present invention discloses techniques for implementing a thin-client graphics terminal system.

BACKGROUND OF THE INVENTION

Centralized computer systems with multiple independent terminal systems for accessing the centralized computer systems were once the dominant computer system architecture. These centralized computer systems were initially very expensive mainframe or mini-computer systems that were shared by multiple computer users. Each of the computer system users accessed the centralized computer systems using a computer terminal system coupled to the centralized computer systems.

In the late 1970s and early 1980s, semiconductor microprocessors and memory devices allowed for the creation of inexpensive personal computer systems. Personal computer systems revolutionized the computing industry by allowing each individual computer user to have access to a full computer system without having to share the computer system with any other computer user. Each personal computer user could execute their own software applications and any problems with the computer system would only affect that single personal computer system user.

Although personal computer systems have become the dominant form of computing in the modern world, there has been a resurgence of the centralized computer system model wherein multiple computer users access a single server system using modern terminal systems that include high-resolution graphics. Computer terminal systems can significantly reduced computer system maintenance costs since computer terminal users cannot easily introduce computer viruses into the main computer system or load other unauthorized computer programs. Terminal based computing also allows multiple users to easily share the same set of software applications.

Modern personal computer systems have become increasingly powerful in the decades since the late 1970's personal computer revolution. Modern personal computer systems are now more powerful than the shared mainframe and mini-computer systems of the 1970's. In fact, modern personal computer systems are so powerful that the vast majority of the computing resources in modern personal computer systems generally sit idle when a typical computer user uses a modern personal computer system. Thus, personal computer systems can now easily serve multiple computer users.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in other environments. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a non-exclusive or, such that "A or B" includes "A but not B,"

"B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
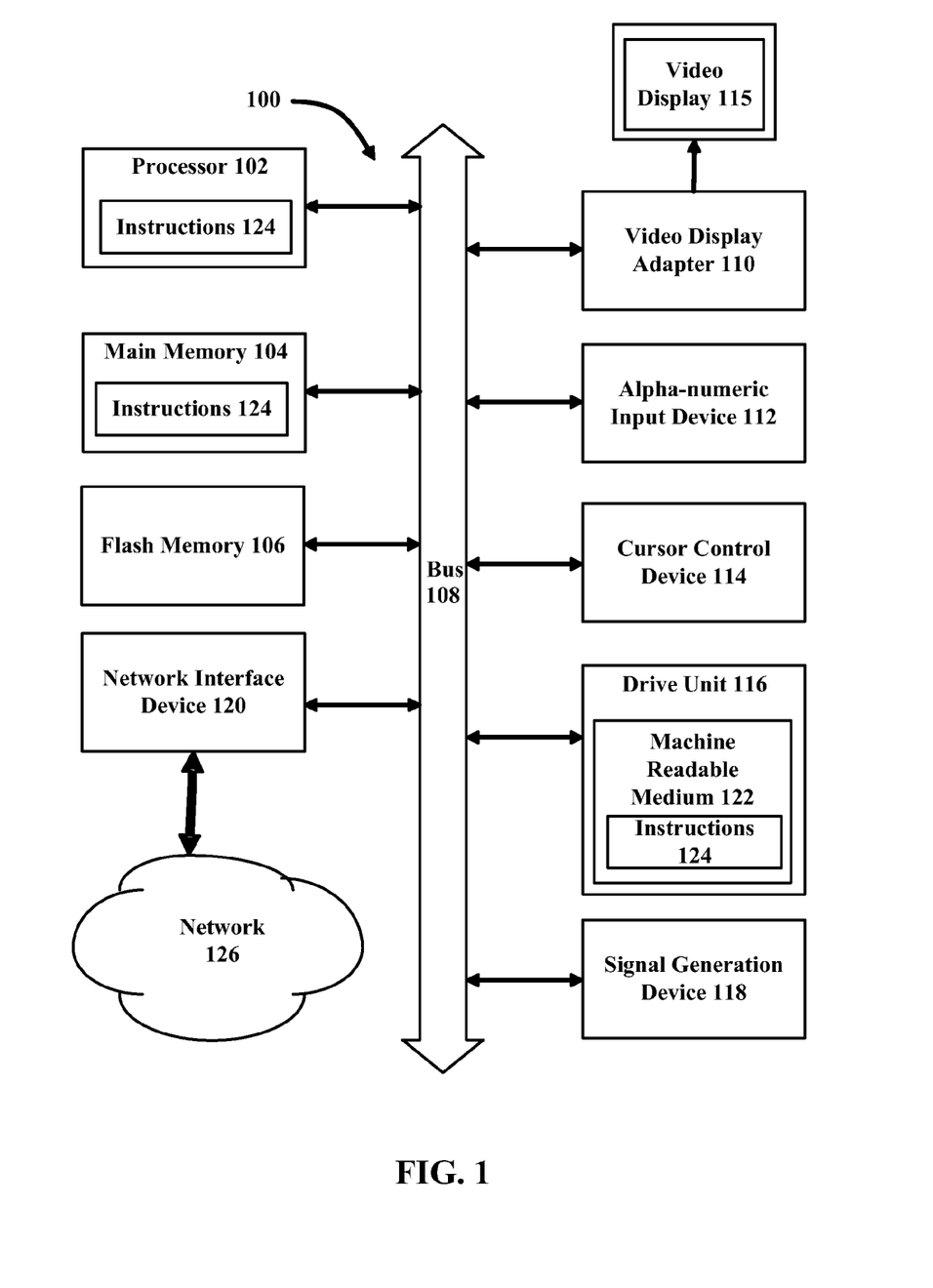
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a flash memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Modern Thin-Client Terminal Systems

In recent years, a new generation of terminal systems that support high-resolution graphics have been introduced into the computer market. These new terminal systems have allowed a new generation of users to rediscover many of the advantages of a terminal-based computing architecture. For example, computer terminals allow for improved computer system security and reduced maintenance costs since users of computer terminal systems cannot easily introduce computer viruses by downloading or installing new software into the computer system from the terminal system. Thus, with a centralized computer system having multiple terminals, only the main centralized computer server system needs to be closely monitored and maintained. The stateless terminal systems require almost no maintenance at all.

One category of these modern terminal systems is called "thin client" systems since the terminal systems are a "client" to main computer system that acts as a server and the terminal systems are designed to be very simple and limited (thus "thin"). This thin-client terminal systems primarily depend on a thin-client server system for all (or nearly all) of their application processing activities. A thin-client terminal system thus mainly focuses only on conveying output from the centralized server system to the user and input from the user to the centralized server system.

The new generation of computer terminal systems provide features that did not exist during the prior era of computer terminal usage. Specifically, modern terminal systems include modern amenities such as high-resolution graphics capabilities, audio output, and cursor control system input (mouse, trackpad, trackball, etc.). Thus, modern terminal systems can provide all the features that users of modern personal computer systems have become accustomed to using.

A First Thin-Client System Example Embodiment

Figure 2A:
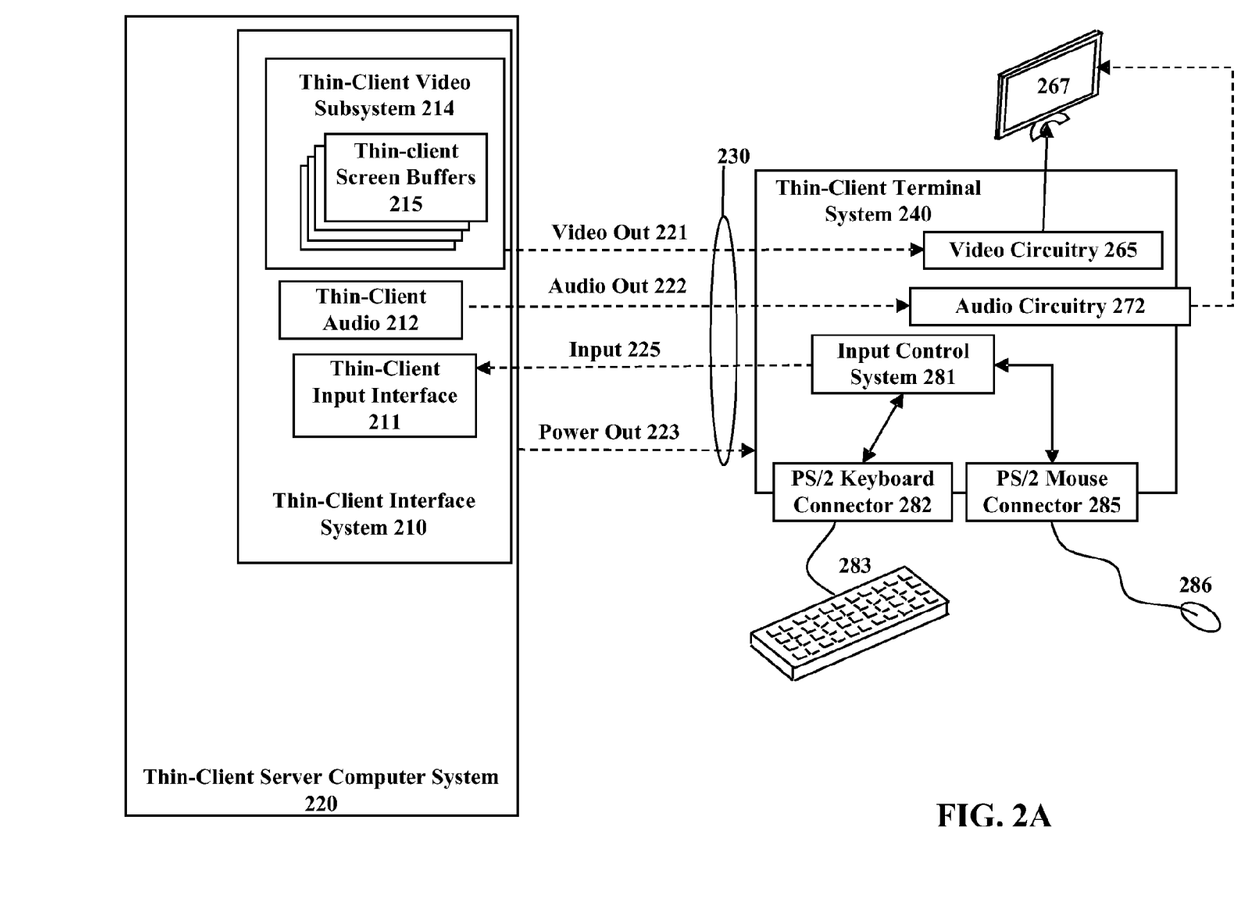
FIG. 2A illustrates a block diagram of a first example embodiment of a thin-client terminal system coupled to a thin-client server computer system.

FIG. 2A illustrates a block diagram of a first type of thin-client terminal architecture. In the thin-client architecture of FIG. 2A, a server computer system 220 is illustrated coupled to one (of possibly many) thin-client terminal system 240. The thin-client server computer system 220 and thin-client terminal system 240 are coupled with a multi-conductor cable 230 that carries input from a user of the thin-client terminal system 240 to the server computer system 220 and output from the server computer system 220 to the thin-client terminal system 240.

Figure 2B:
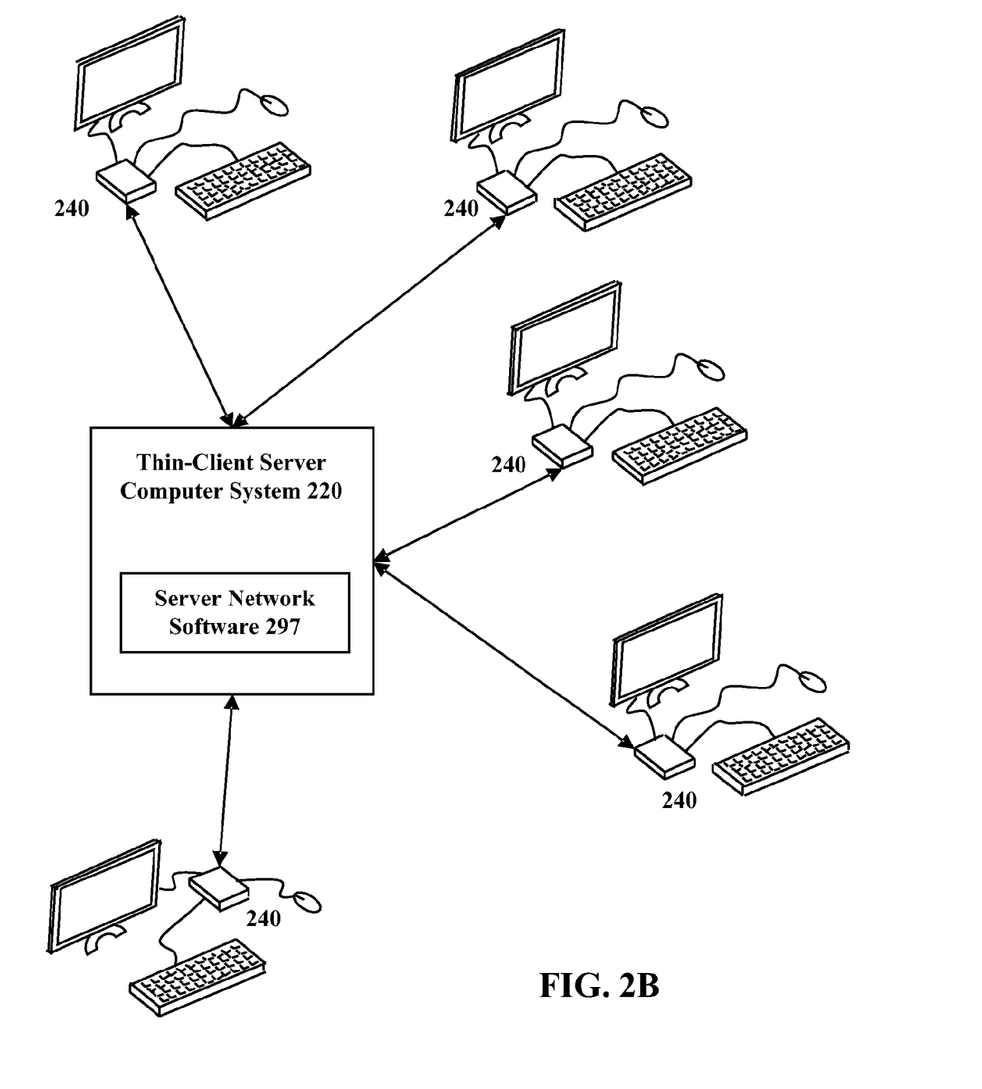
FIG. 2B illustrates a high-level block diagram of the example single thin-client server computer system of FIG. 2A supporting multiple individual thin-client terminal systems using multi-conductor wire that includes analog signals and electrical power.

FIG. 2B illustrates a conceptual diagram of the server computer system 220 from FIG. 2A providing computer processing resources to a plurality of individual thin-client terminal systems 240. A single thin-client server computer system 220 is coupled to several individual thin-client terminal systems 240 in a hub & spoke arrangement since the embodiment of FIG. 2A requires a direct connection between the thin-client server computer system 220 and each of the thin-client terminal systems 240. The individual thin-client terminal systems 240 are served using thin-client server network software 297 running on thin-client server computer system 220.

Referring back to FIG. 2A, the thin-client terminal system 240 acts largely as a simple pass through system such that most of the hardware for driving the thin-client system actually resides within the server computer system 220. This type of thin-client system architecture allows the actual thin-client terminal devices 240 in the implementation of FIG. 2A to be a very inexpensive. However, to use the simple thin-client terminal system 240 illustrated in FIG. 2A with a personal computer system (such as server system 220), additional add-on hardware and software must be added to the personal computer system. In one embodiment, the add-on hardware may be implemented as an add-in PCI card that may be added to the personal computer system. However, other methods of adding the needed hardware may be used such as using an add-on Universal Serial Bus (USB) peripheral device.

In the embodiment of FIG. 2A, a thin-client interface system 210 is responsible for interacting with all of the attached thin-client terminal systems 240. To generate video output for each thin-client terminal system 240, a thin client video subsystem 214 in the server system 220 maintains a screen buffer 215 for each of the each thin-client terminal systems 240. Video display circuitry within the server system 220 reads the screen buffer 215 contents and drives a video output signal 221 for each for each thin-client terminal system 240. Relatively simple video circuitry 265 in the thin-client terminal system 240 passes the video output signal to a video display monitor 267. Audio may be handled in a similar manner wherein a thin-client audio system 212 generates audio output 222 for each thin-client terminal systems 240. In the embodiment of FIG. 2A, the audio information is also passed from audio circuitry 272 to the audio input of a display monitor 267 that is capable of outputting audio. In one embodiment, the thin-client audio system 212 outputs a digital auto signal to the thin-client terminal system 240 which is then decoded and demodulated by the audio circuitry 272 into an analog audio signal at the thin-client terminal system 240.

Input from the thin-client terminal system 240 is handled using an input control system 281 that receives user input information from a keyboard 283 (coupled to a PS/2 keyboard connector 282) and a cursor control device 286 (such as a mouse) that is coupled to a PS/2 cursor control device input connector 285. The input control system 281 encodes the user input information (keystrokes and cursor control device movements) and passes that user input information to a thin-client input interface system 211 in the server system 220. In one particular embodiment, the design of the thin-client terminal systems 240 is so efficient that each thin-client terminal system 240 receives all of its needed electrical power from a power out conductor 223 in the multi-conductor wire 230.

On the server side, the thin-client server computer system 220 is equipped with software for interacting with one or more thin-client terminal systems. As illustrated in FIG. 2A, a thin-client interface system 210 within thin-client server system 220 supports the thin-client terminal system 240 (as well as other thin-client terminal systems depending on the implementation) coupled to thin-client server system 220. Each thin-client terminal system 240 supported by thin-client server system 220 will have its own dedicated screen buffer 215 within the thin-client video subsystem 214 of the thin-client server system 220.

The thin-client terminal system illustrated in FIGS. 2A and 2B is very inexpensive and operates very well. But the thin-client terminal system illustrated in FIGS. 2A and 2B does have some drawbacks. As set forth in FIG. 2A, each thin-client terminal system 240 uses a PS/2 connector to receive keyboard and cursor control input. In recent years, the standard PS/2 connector has become less popular. The PS/2 connector is only used for keyboard and cursor control input and thus is not very versatile. The PS/2 connector is now largely being replaced by the more popular Universal Serial Bus (USB) connector for user input. The USB connector allows many different USB devices to be used when a keyboard or mouse is not required. Furthermore, since it is a bi-directional communication system, more features can be implemented in USB based user input devices. Thus, it would be desirable to replace the PS/2 keyboard connector 282 and PS/2 cursor control device input connector 285 in FIG. 2A with a USB connector.

An Example First Thin-Client Terminal System with USB Input

Figure 3A:
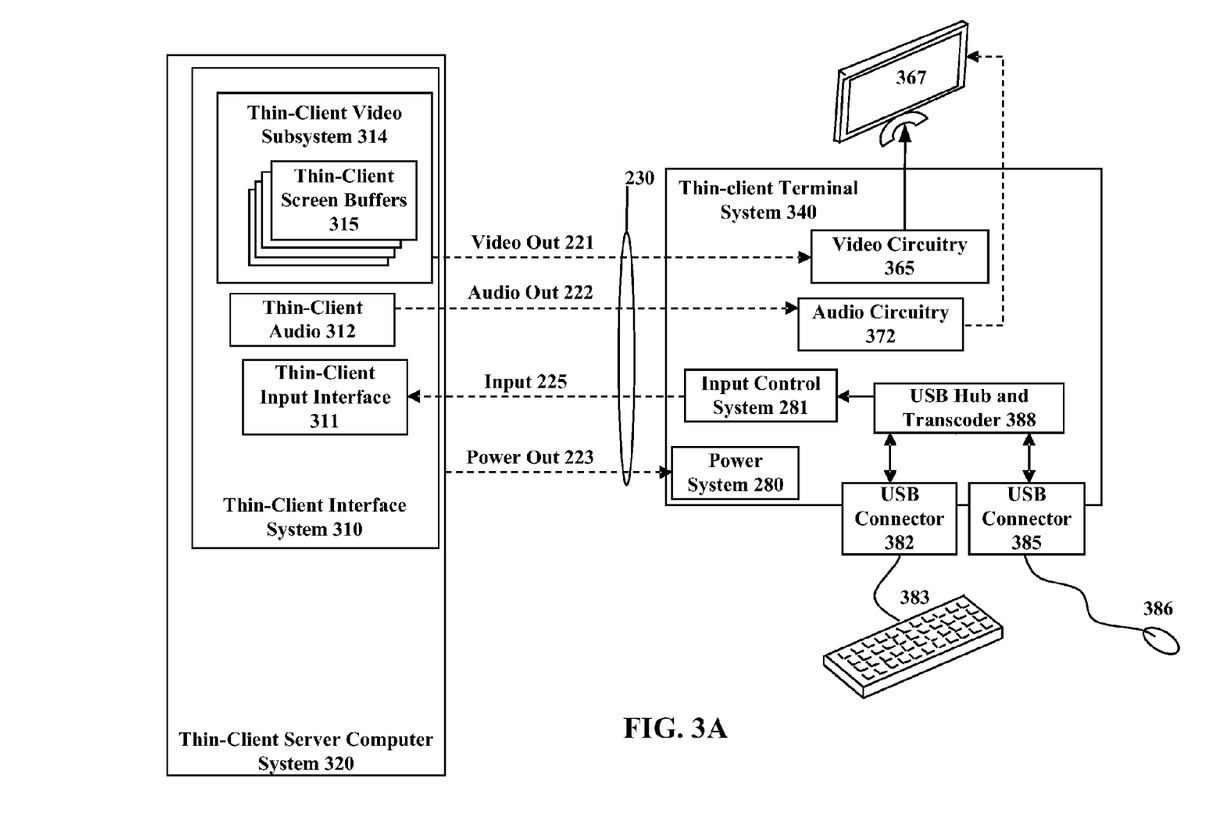
FIG. 3A illustrates a high-level block diagram of a first example system for providing USB input to the thin-client terminal system illustrated in FIGS. 2A and 2B.

FIG. 3A illustrates a high-level block diagram of a first method of providing USB input to the thin-client terminal system illustrated in FIGS. 2A and 2B. Referring to FIG. 3A, the keyboard connector 282 and PS/2 cursor control device input connector 285 of FIG. 2A have been replaced with USB connector 382 and USB connector 385 in thin-client terminal system 340. In this manner, a USB keyboard 383 and USB mouse 385 may be coupled to the thin-client terminal system 340 to provide user input.

To handle the input from the USB keyboard 383 and USB mouse 385, a combination USB Hub and transcoder 388 has been added to the thin-client terminal system 340. From the perspective of the USB keyboard 383 and USB mouse 385, the combination USB Hub and transcoder 388 acts the same as any other ordinary USB hub. However, instead of being coupled to an upstream USB host controller, the combination USB Hub and transcoder 388 contains transcoder circuitry that translates the USB user input information into a format suitable by the thin-client input interface 311 in the server system 320.

In one embodiment, the transcoder of the combination USB Hub and transcoder 388 device translates the USB based user input data into PS/2 formatted user input data. The PS/2 formatted user input data may then be passed to the input control system 281 that transmits the data back to the server system 320 in the same manner as the system of FIG. 2A.

Figure 3B:
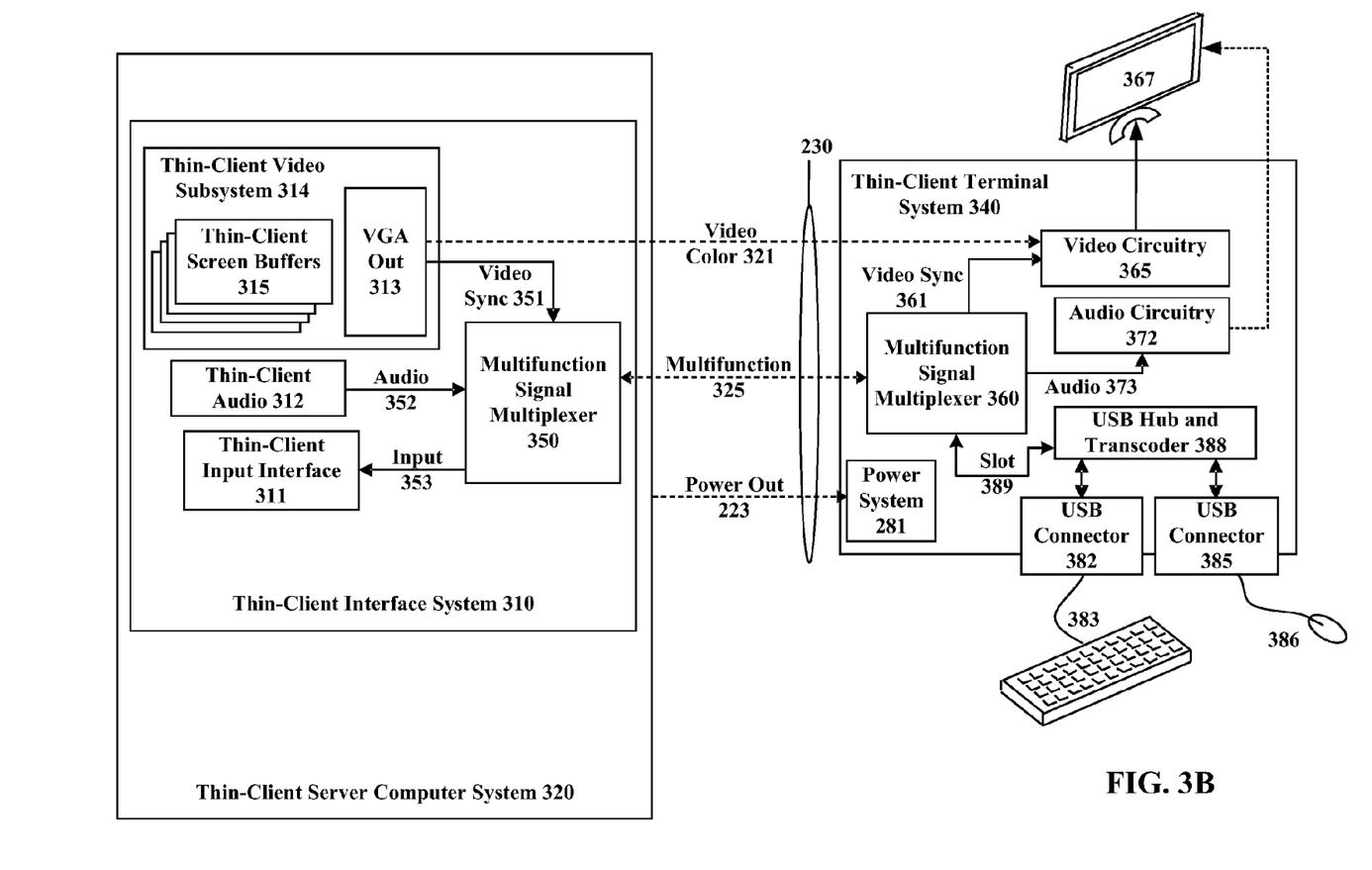
FIG. 3B illustrates a detailed diagram of one possible implementation of the example system in FIG. 3A that allows the user input data to be transmitted on a single multi-function line.

FIG. 3B illustrates a detailed diagram of one possible implementation that allows the user input data to be transmitted on a single multi-function line 325 in a highly efficient manner. In the embodiment of FIG. 3B, a thin-client server computer system 320 may include a thin-client interface system 310 that communicates with a thin-client terminal system 340. The thin-client interface system 310 may include a thin-client video subsystem 314 having a VGA video output circuit 313 that outputs video color signals (and corresponding grounds) out onto video color line 321 that is transmitted directly to the thin-client terminal system 340. The video color signals may be analog RGB signals. VGA video output circuit 313 also may provide video sync signals 351 (e.g., horizontal sync ("hsync") and vertical sync ("vsync") signals) to a multifunction signal multiplexer 350 of the thin-client server computer system 320. The multifunction signal multiplexer 350 also receives digital audio 352 from the thin-client audio system 312 of the thin-client interface system of the server system 320. The multifunction signal multiplexer 350 multiplexes the video sync signals with the digital audio signal onto the single multi-function line 325 and transmits this data to the thin-terminal system 340.

In the thin-client terminal system 340, a corresponding multifunction signal multiplexer 360 receives the multiplexed digital audio and video sync information. The multifunction signal multiplexer 360 provides the digital audio 373 to audio circuitry 372 that generates an analog audio signal for output. In FIG. 3B, the analog audio is provided to a display monitor 367 that includes audio capabilities. Similarly, the multifunction signal multiplexer 360 provides the video synchronization information 361 to video circuitry 365. Video circuitry 365 combines the video synchronization information 361 with the video color signals 321 to create a standard video output signal such as an analog VGA output signal that is provided to display system 367.

The multifunction signal multiplexer 360 also takes the coded user input information 389 from the combination USB Hub and transcoder 388 and transmits that coded user input information 389 back to the multifunction signal multiplexer 350 in the server system. The multifunction signal multiplexer 350 in the server system 320 and the multifunction signal multiplexer 360 in the terminal system may share the multifunction signal line 325 in a time division multiplexing manner. In one embodiment, the video synchronization information 351 is used as a clocking signal to determine the time periods when data (such as the digital audio 352) is transmitted from the server system 320 to the terminal system 340 and when data (such as the user input data 389) is transmitted from the terminal system 340 to the server system 320.

In addition to the video color lines 321 and the multifunction line 325, a power signal 223 may be provided from the server system 320 to the terminal system 340 in order to provide the terminal system with operating power. In this manner, no external power supply is needed for the terminal system 340. In one example embodiment, an 8-signal conductor such as a Category 5 or Category 6 twisted pair cable with an RJ-45 connector may be used as the multi-conductor cable 230. Six wires of the 8-signal conductor are used to carry the three color signals (e.g., RGB signals) and their corresponding ground signals, one wire of the 8-signal conductor is used as the multifunction line 325, and one wire of the 8-signal conductor is used to carry power 223.

In an example embodiment, the thin-client interface system 310 may be implemented on a printed circuit board having an interface compatible with the Peripheral Component Interconnect (PCI) specification. For example, the thin-client interface system 310 may be implemented as a PCI expansion card that fits into a PCI slot on a motherboard in the thin-client server computer system 320. The PCI expansion card may include one or more RJ-45 ports to receive the multi-conductor cable 230.

Figure 4:
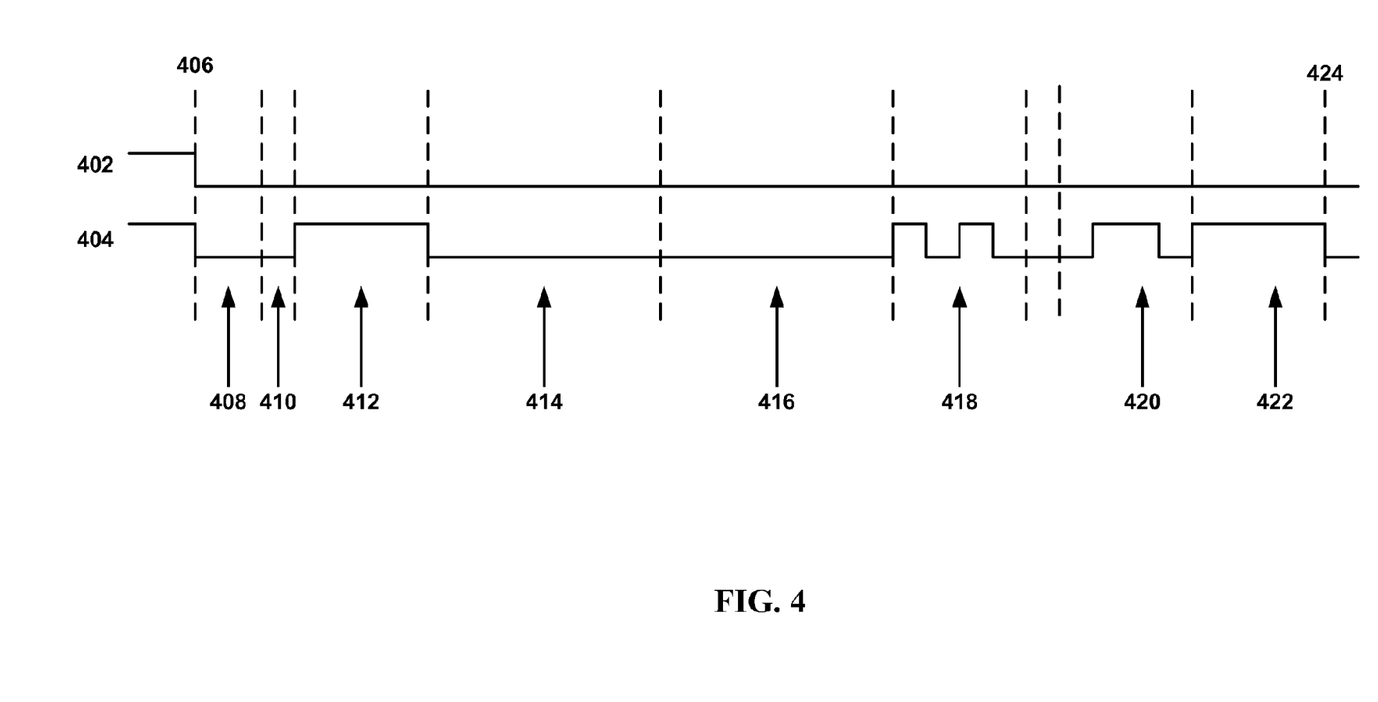
FIG. 4 illustrates a diagram of an example embodiment by which multiplexed data is transmitted between a thin-client server computer system and a thin-client terminal system.

FIG. 4 illustrates a diagram of an example embodiment in which multiplexed data is transmitted between a thin-client server computer system and a thin-client terminal system using a multi-conductor cable. Referring to the example embodiment of FIG. 3, a multi-conductor cable 230, such as a Category 5 or Category 6 cable with RJ-45 connectors, may transmit three video color signals (e.g., RGB), three corresponding ground signals, a power signal, and a multiplexed data signal. In an example embodiment, the three video color signals and their corresponding grounds and the power signal may be transmitted over dedicated wires in the multi-conductor cable 230. The multiplexed data signal, however, may operate in a time division multiplexing scheme such that output data (e.g., video synchronization signals, audio data) may share a wire in the multi-conductor cable 230 with input data received from the thin-client terminal system 340.

Figure 5:
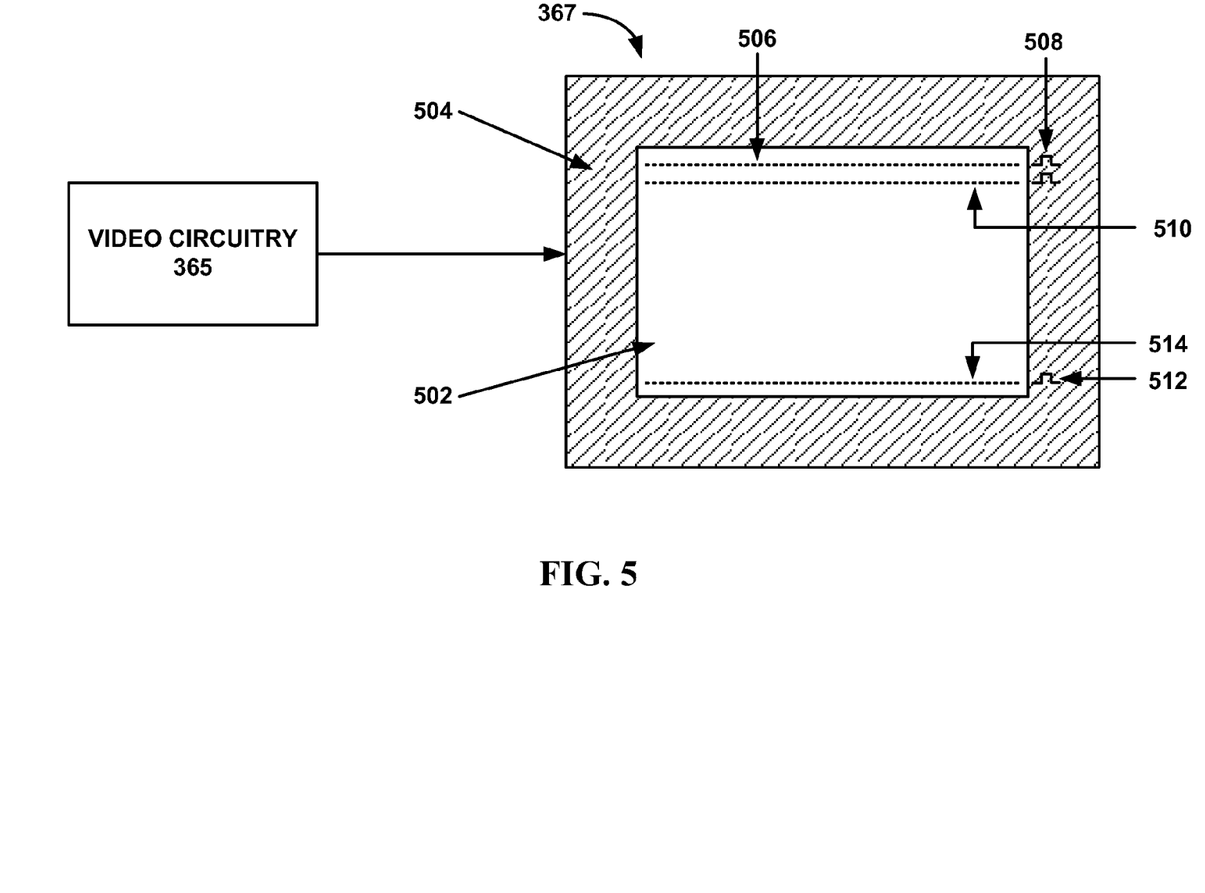
FIG. 5 illustrates a diagram of an example embodiment in which video information is written by a display device of a thin-client terminal system.

The process by which video information is displayed on a display device may influence the transfer of multiplexed data using the time division multiplexing scheme. FIG. 5 illustrates a diagram of an example embodiment in which a display device displays video data. Display device 367 may include a display screen area 502 and an off-screen area 504 surrounding the display screen area 502. The off-screen area 504 is not displayed, but rather is used for timing purposes. Video circuitry 365 may combine video data (e.g., RBG video color data) generated at the thin-client server computer system and passed to the thin-client terminal system via the multi-conductor cable 230 to form a video signal for display on the display device 367, with the display device 367 drawing the video signal on a horizontal line-by-line basis. When the display device drawing a horizontal line 506 reaches the end of the display screen area 502, video circuitry 365 may transmit a hsync signal 508 to the display device 367. Preceding a rising edge of the hsync signal may be a front porch that serves as a delay between the end of the video data of a scanline and a rising edge of a hsync impulse. Following the front porch, the hsync pulse may be asserted for a predetermined period of time. This period of time may be defined as a standard by the Video Electronics Standards Association (VESA). When the hsync signal 508 is no longer asserted, a back porch may serve as a delay between a falling edge of the hsync pulse and the writing of video data to the next horizontal scanline. The duration of the back porch also may be defined by VESA. A vsync signal 512 may synchronize a video frame change with a vertical blanking interval of the display device 367. The vertical blanking interval may be the time difference between the last line of one frame and the beginning of the first line of the next frame. The vsync signal may inform the display device that the display device is finished drawing the last horizontal line 514 and that a new video frame is to be drawn. Thus, when the vsync signal is no longer asserted, the display device 367 will begin drawing the next video frame from the top-most horizontal row (e.g., horizontal row 506) in a left-to-right direction.

When the display device 367 is drawing each horizontal line of a video frame on the display device, no data is transmitted over the multiplexed wire of the multi-conductor cable to avoid the possibility of noise disrupting the video information displayed on the display screen. Multiplexed data instead is transmitted after both the end of the writing of a horizontal line and the falling edge of a hsync signal. Thus, during the back porch of the hsync signal, multiplexed data may be transmitted between the thin-client server computer system 320 and the thin-client terminal system 340.

Referring to FIG. 4, upon the detection of the falling edge 406 of the hsync signal 402, the thin-client server computer system 320 may begin transmitting multiplexed data (shown in FIG. 4 in terms of a data line 404) to the thin-client terminal system 340. In an example embodiment, the first bits transmitted may include two zero start bits 408, followed by a vsync bit 410. Bits 412 corresponding to the current state of two independent Personal System/2 (PS/2) channels for a keyboard and a mouse may follow. In an example embodiment, PS/2 commands may be transmitted as well. More detailed discussion of the transmission of PS/2 commands within the time division multiplexing scheme follows below. In an example embodiment, the bits may comprise a data bit and a sync bit for a first PS/2 connection and a data bit and a sync bit for a second PS/2 connection. Audio sampling data in the form of a 7-bit encoding of delta modulation for a left audio channel 414 and a 7-bit encoding of delta modulation for a right audio channel 416 may follow the PS/2 data. To signify the end of the packet transmission, the thin-client server computer system may output an ending bit sequence. In an example embodiment, the ending bit sequence may comprise a 4-bit sequence having bit values 1-0-1-0, although it is contemplated that other bit sequences may be used.

Upon receipt of the ending bit sequence, the thin-client terminal system may begin transmitting data in reply to the thin-client server computer system. As each thin-client terminal system may have a different sampling rate, the thin-client terminal system may initially reply to the thin-client server computer system 320 with data related to the sampling rate 422. For example, the thin-client terminal system may send data informing the thin-client server computer system 320 to increase or decrease the sampling rate. The thin-client terminal system further may transmit a current state of the PS/2 connections 424. At time 424, the back porch portion of the hsync pulse may end, indicating that the display device 367 is about to begin drawing another horizontal line across display area 502. When the back porch portion of the hsync pulse ends, the thin-client terminal system 340 ceases transmission of data in reply to the thin-client server computer system 320.

The foregoing example embodiment of FIG. 4 illustrates the transfer of multiplexed data during the duration of the back porch portion of the hsync pulse. Transferring PS/2 commands and data may require the transmission of data over multiple hsync signals. For example, transmission of a PS/2 command or code from the thin-client server computer system 320 to the thin-client terminal system may require approximately 110 hsync signals. To transmit a PS/2 code, the thin-client server computer system 320 (e.g., host) performs a relatively lengthy preamble to initiate the transfer of the PS/2 code. The preamble includes putting the clock (or sync) and data lines in a "request to send" state by inhibiting communication by pulling the clock low for a predetermined amount of time (e.g., 100 microseconds). The thin-client server computer system 320 may then pull the data line low to apply the "request to send" state, followed by releasing the clock. Only after the host releases the clock does the PS/2 device generate its own clock or sync signal. When the PS/2 device sets its clock signal low, the host may transmit the first data bit. This process is repeated for each additional bit, with a PS/2 code comprising a start bit, eight data bits, a parity bit, and a stop bit.

Transmission of PS/2 data from the thin-client terminal system to the thin-client server computer system may take a shorter amount of time than transmission of PS/2 data from the thin-client server computer system to the thin-client terminal system due to the lack of the preamble to initiate data transfer. To transmit a PS/2 byte of data, 11 bits must be sent, including a start bit, 8 data bits, a parity bit, and a stop bit. Each bit may take 4 hsync periods to send, with the PS/2 byte taking 44 hsync periods. In a video resolution mode of 800× 600 pixels with a 60 Hz refresh rate, the hsync frequency may be approximately 37.8 KHz and the horizontal display line time may be approximately 26.4 microseconds. Thus, transmission of a byte of PS/2 data from the thin-client terminal system to the thin-client server computer system would take approximately 1,162 milliseconds. In a video resolution mode of 1280×1024 pixels, the hsync frequency may be approximately 63.981 KHz, and the horizontal display line time may be approximately 15.6 microseconds. Thus, the transmission of a byte of PS/2 data would take approximately 687 microseconds.

An Example Second Thin-Client Terminal System with USB Input

Figure 6:
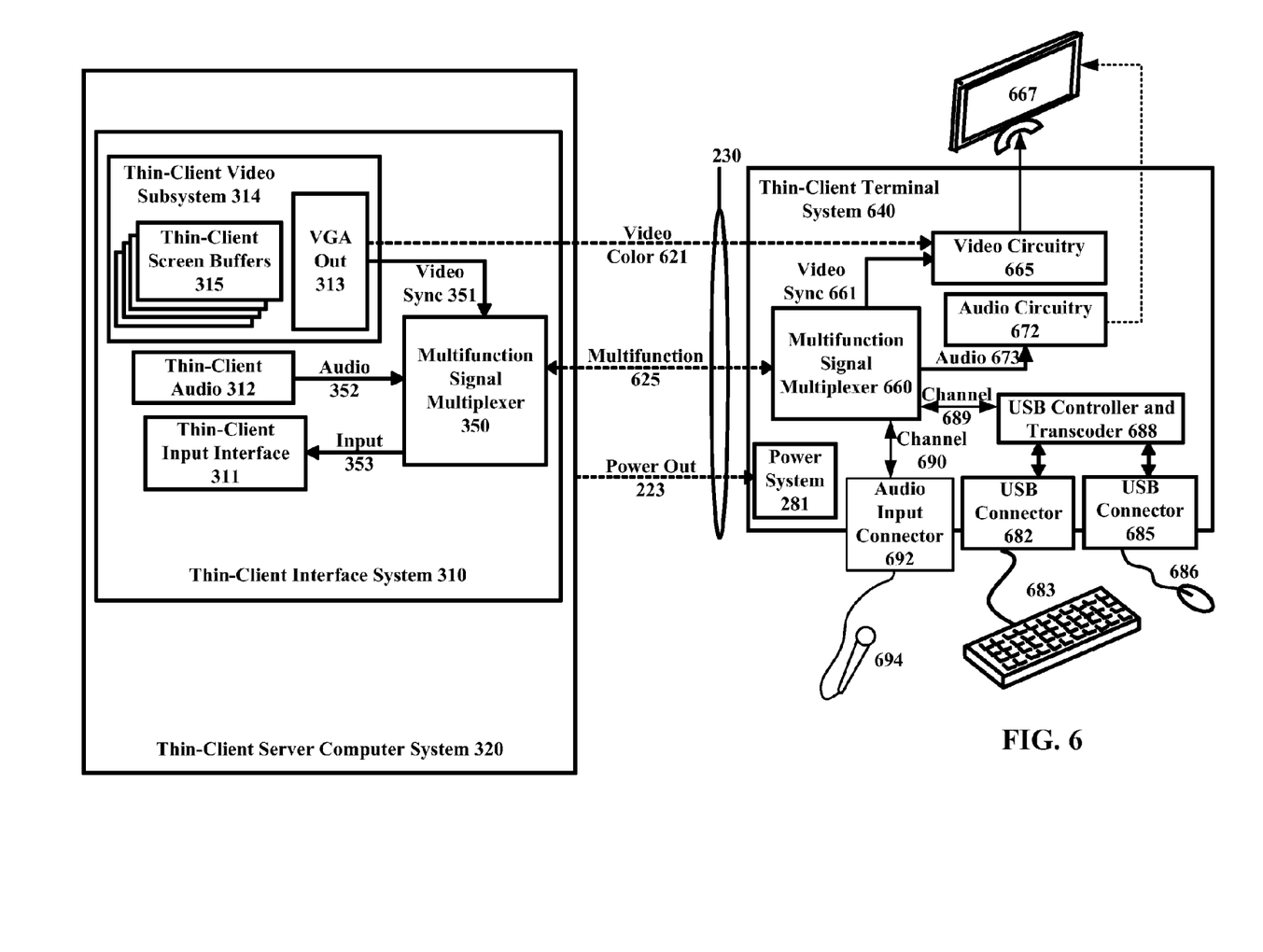
FIG. 6 illustrates an example embodiment of a thin-client terminal system that supports USB input and an audio input.

FIG. 6 illustrates a second embodiment of a thin-client terminal system implemented with support for USB devices. In the embodiment of FIG. 6, the protocol for interfacing with USB devices may be implemented on top of the existing PS/2 interface of the example embodiment of FIG. 3B. In an example embodiment, the thin-client terminal system 640 may support low speed, USB 1.1 Human Interface Devices (HID), such as a keyboard and a mouse. Referring to the example embodiment of FIG. 6, a switchable USB host controller 688 may interface with one of two USB connections 682, 685 at a time. Generally, USB data is transmitted across a twisted-pair data cable that uses two data lines to perform differential signalling. The example embodiment of FIG. 6, however, may be similar to the example embodiment of FIG. 3B, in that a multi-conductor cable 230 having eight wires is used to transmit data between the thin-client server computer system 320 and the thin-client terminal system 640. In an example embodiment, the multi-conductor cable 230 may be a Category 5 or Category 6 twisted cable with RJ-45 connectors. The multi-conductor cable 230 may have seven of its eight wires dedicated to transmitting video color signals 621 (e.g., RGB video signals), corresponding ground signals (not shown), and a power signal 223 to the thin-client terminal system 640. The eighth wire 625 may be used as a bi-directional data wire to transmit data to and from the thin-client terminal system 640. To accommodate the availability of only one wire in the multi-conductor cable 230, the embodiment of FIG. 6 may transcode or convert USB protocol commands into PS/2 commands before the data is transmitted from the thin-client terminal system 640 to the thin-client server computer system 320.

In the example embodiment of FIG. 6, a slot 689 previously allocated as a first PS/2 channel of the thin-client terminal system 640 may service the USB host controller 688, thereby permitting the first slot 689 to control both USB connections 682, 685. The thin-client terminal system 640 may include an oscillator (not shown) that generates a 24 MHz clock signal which is provided to USB connections 682, 685 as a reference clock. With the first slot 689 of the thin-client terminal system 640 controlling both USB sockets, a second slot 690 previously allocated as the second PS/2 channel of the thin-client terminal system 640 may be allocated to support an audio input source 694, such as a microphone, connected via an audio input connector 692.

In an example embodiment, to minimize traffic between the thin-client server computer system 320 and the thin-client terminal system 640, USB protocol commands may be placed into memory (not shown) on the thin-client terminal system 640 as a de facto "database." By placing the USB protocol commands in memory, stored command packets may be referenced by pointers, thereby enabling less data to be transferred over the cable than the commands themselves. The sending of a USB protocol command byte from the thin-client server computer system 320 to the thin-client terminal system 640 may start a USB transaction on a designated USB socket. In response to the initiation of the USB transaction, a packet of USB data may be sent to the thin-client server computer system 320 as multiplexed data using the slots 689, 690 of the thin-client terminal system 640.

The example embodiment of FIG. 6 may be implemented with a minimal set of USB protocol commands. A first command capable of being issued by the thin-client server computer system 320 may instruct the thin-client terminal system 640 to return a current state of USB data lines for a particular USB channel, reset the USB channel, and enable the USB channel to maintain a connection for passing messages to and from the USB channel.

A second command capable of being issued by the thin-client server computer system 320 may concern the transfer of USB packets stored in memory on the thin-client terminal system 640. The transfer of USB command packets to memory may be problematic depending on the type of memory contained in the thin-client terminal system 640. To solve this problem, the PS/2 command slot 689 may be utilized with a special command to download new or additional USB command packets to the memory during an initialization phase. If volatile memory is used in the thin-client terminal system 640, this is required every time power is applied to the thin-client terminal system 640 (or during the initialization phase). If flash memory is used in the thin-client terminal system 640, the same method may be utilized, but the terminal system may need to have the capability to add the new contents to the flash memory (e.g., an erase/write procedure). The second command may identify a channel through which data is to be transmitted and may include a six-bit index to identify which stored USB packets are to be transmitted. In an example embodiment, the memory in the thin-client terminal system 640 may store 512 words, with each USB packet to be transferred being 8 words in size. Consequently, a six-bit index may permit the referencing of every USB packet stored in memory. The first and second commands may be identified by the setting of a bit in the command. In an example embodiment, the seventh bit of the command may delineate between the first and second commands. For example, if the seventh bit of the command is set, the command may be the first command, whereas a cleared seventh bit of the command may identify that the command is the second command. The thin-client server computer system 320 of the example embodiment of FIG. 6 also may periodically poll the USB devices of the thin-client terminal system 640 for new user input device commands, such as keyboard commands or mouse commands.

The thin-client terminal system 640 of the example embodiment of FIG. 6 also may support input data from an audio input device 694, such as a microphone. In an example embodiment, the thin-client terminal system 640 may contain a 7-bit digital-to-analog converter (DAC) and comparator (not shown). In an example embodiment, the DAC may sample and transmit input microphone signals in seven steps. For example, during the back porch of each asserted HSYNC signal, one bit of a microphone sample may be transmitted over the slot 690 previously allocated as a second PS/2 channel to be multiplexed for transmission to the thin-client server computer system 320. Every seventh bit of the microphone sample may be marked as the start of the microphone sample by a sync line of the second PS/2 channel 690. Thus, the sampling rate for a microphone signal may be the frequency of the HSYNC signal divided by 7. In an example embodiment where the thin-client terminal system 640 is implemented with a 1280×1024 video mode, the sampling rate may be approximately 9 KHz (~64 KHz HSYNC/7). In an example embodiment where the thin-client terminal system 640 is implemented with a 1440×900 video mode, the sampling rate may be approximately 8 KHz (56 KHz/7).

The thin-client server computer system may support multiple thin-client terminal systems, such as the thin-client terminal system embodiment of FIG. 6, with a multi-conductor cable 230 connecting the thin-client server computer system with each thin-client terminal system.

Figure 7:
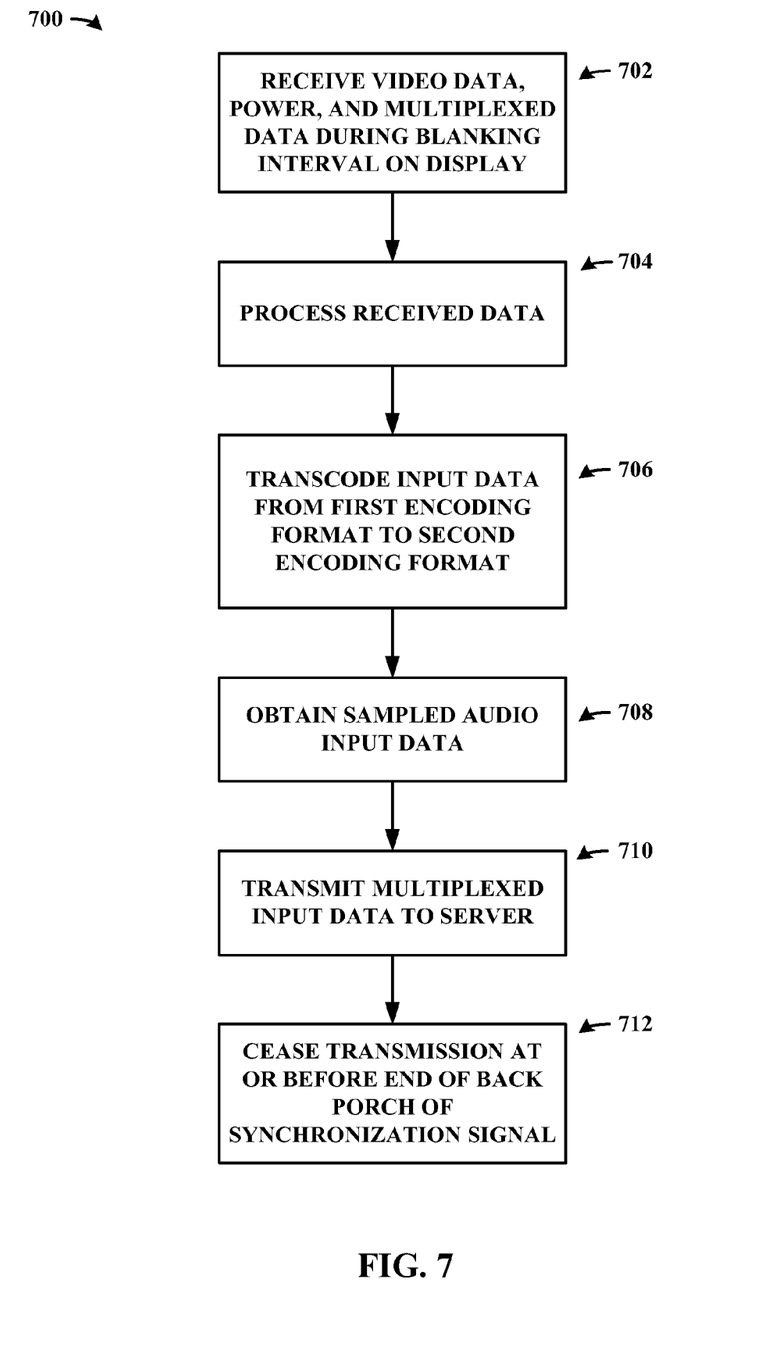
FIG. 7 illustrates a flow chart of an example method for providing a thin-client terminal system supporting USB and audio inputs.

FIG. 7 illustrates a flow diagram of an example embodiment of a method for transmitting multiplexed data between a thin-client server computer system and a thin-client terminal system. At operation 702, multiplexed video synchronization information, PS/2 or USB interface commands, and audio information may be received via a bi-directional wire of a multi-conductor cable by a thin-client terminal system 640. The video synchronization information may include HSYNC and VSYNC signals, while the audio information may include audio samples for both left and right audio channels. In an example embodiment, the multiplexed data may be transmitted during a HSYNC blanking interval to prevent noise from disrupting the video information presented on a display screen 667 of the thin-client terminal system 640. In an example embodiment, the multiplexed data may be transmitted upon detection of a falling edge of a HSYNC signal and prior to the end of a back porch portion of the HSYNC pulse. The receipt of the multiplexed data may cease with an ending transmission bit sequence. Video component signals (e.g., RGB video color signals) and their corresponding ground signals may be received by video circuitry in the thin-client terminal system. The video component signals may be received from a first set of three wires of the multi-conductor cable, while the ground signals may be received from a second set of three wires of the multi-conductor cable. The video component signals and video synchronization information may be used to form a video signal to be output for display on a display device connected to the thin-client terminal system.

At operation 704, the received USB or PS/2 commands may be issued to attached PS/2 devices or a selected USB device based on the transmitted PS/2 or USB interface commands. In an example embodiment, a first PS/2 channel 689 may service a switchable USB host controller 688 that connects to one of two USB sockets. A USB command received via the PS/2 channel 689 may be routed to the USB host controller 688 for controlling a USB channel identified in the USB command.

At operation 706, in response to the commands, the PS/2 devices or the one or more USB input devices may submit user input data to corresponding one or more PS/2 or USB interface ports or reply data. USB input data or reply data may be transcoded by a transcoder into PS/2-compatible data. The transcoded USB data may be transmitted via a first PS/2 channel 689 in the thin-client terminal system 640 to a data multiplexer 660. The transcoded USB data may be multiplexed and transmitted to the thin-client server computer system 640 during the HSYNC blanking interval. In an example embodiment, the transmission of the transcoded USB data may occur during a back porch portion of the HSYNC blanking interval.

At operation 708, microphone input data also may be transmitted with the PS/2 or USB reply data. In an example embodiment, during the HSYNC blanking interval, one bit of microphone sampling data may be transmitted via a second PS/2 channel 690 to a multiplexer 660 for multiplexing with the PS/2 or transcoded USB reply data. The microphone input may be sampled using a 7-bit DAC and comparator in the thin-client terminal system. Thus, transmission of one bit of microphone sampling for each HSYNC blanking interval may result in a sample of microphone data being transmitted in 7 HSYNC blanking intervals. It is contemplated that actual microphone sampling may occur separately from the transmission of the sampled microphone data.

At operation 710, the multiplexed USB or PS/2 input or reply data and audio input data may transmitted to the thin-client server computer system. In an example embodiment, the multiplexed input data (e.g., USB input and reply data, audio input data samples) may be transmitted over the same bi-directional wire of the multi-conductor cable 230 from which the received video data, power, and multiplexed data was received. In an example embodiment, transmission of the multiplexed input data to the thin-client server computer system 320 may commence in response to receipt of the ending transmission bit sequence that signifies the cessation of data transmission from the thin-client server computer system 320 to the thin-client terminal system.

At operation 712, either prior to or at the end of the back porch portion of the HSYNC pulse, the transmission of multiplexed input data from the thin-client terminal system 640 to the thin-client server computer system 320 may cease to prevent any data transmission from interfering with the drawing of the video signal on the display device.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A thin-client terminal system, comprising:
   a multiplexer communicatively coupleable to a server system by a multi-conductor cable including a first line and a second line, the multiplexer being configured to receive digital video synchronization data from the server system via the first line of the multi-conductor cable;
   video circuitry communicatively coupled to the multiplexer and configured to receive analog video component signals from the server system through the second line of the multi-conductor cable and the digital video synchronization data from the multiplexer, the video circuitry configured to output video signals to an analog display device, the video signals including the analog video component signals and the digital video synchronization data;
   a first serial bus interface component configured to connect to an input device; and
   a transcoding serial bus hub communicatively coupled to the first serial bus interface component and the multiplexer, the transcoding serial bus hub configured to:
      receive first input data from the first serial bus interface component, the first input data encoded in a first serial interface encoding format; and
      transcode the encoded first input data from a first serial interface encoding format to a second serial interface encoding format; and
      provide the transcoded first input data to the multiplexer, the multiplexer configured to transmit, via the first line of the multi-conductor cable, the transcoded first input data to the server system during a blanking interval on the analog display device displaying the video signals.

2. The thin-client terminal system of claim 1, wherein the first serial interface encoding format is a Universal Serial Bus (USB) format, and wherein the second serial interface encoding format is a Personal System/2 (PS/2) format.

3. The thin-client terminal system of claim 1, further comprising a second serial bus interface component configured to connect to a serial bus device, the second serial bus interface component communicatively coupled to the transcoding serial bus hub and further configured to transmit second input data to the transcoding serial bus hub.

4. The thin-client terminal system of claim 1, further comprising audio circuitry communicatively coupled to the multiplexer, wherein the multiplexer receives audio output data from the server system, wherein the multiplexer provides the audio output data to the audio circuitry, and wherein the audio circuitry outputs an audio signal to the analog display device.

5. The thin-client terminal system of claim 1, wherein the multiplexer receives multiplexed data from the server system via the first line of the multi-conductor cable, the multiplexed data including the digital video synchronization data and audio output data.

6. The thin-client terminal system of claim 5, wherein the multiplexer is configured to receive the multiplexed data during the blanking interval on the analog display device of the thin-client terminal system.

7. The thin-client terminal system of claim 6, wherein power is received by a power component of the thin-client terminal system on a fifth wire of the multi-conductor cable, and wherein ground signals corresponding to the analog video component signals are received by the video circuitry on a second set of three wires of the multi-conductor cable.

8. The thin-client terminal system of claim 5, wherein the multiplexed data includes an end of transmission bit sequence, wherein the multiplexer is configured to transmit the transcoded input data in response to receipt of the end of transmission bit sequence.

9. The thin-client terminal system of claim 1, wherein the analog video component signals are received by the video circuitry from a first set of three wires of the multi-conductor cable, a first wire of the first set of three wires corresponding to the second line, and wherein the digital video synchronization data and audio output data are multiplexed and received by the multiplexer on a fourth wire of the multi-conductor cable, the fourth wire corresponding to the first line.

10. The thin-client terminal system of claim 1, wherein the multi-conductor cable is one of a Category 5 cable and a Category 6 cable, wherein the multi-conductor cable has RJ-45 connectors.

11. The thin-client terminal system of claim 1, wherein the video circuitry is further configured to send the analog video component signals from the server system directly to the analog display device.

12. A method, comprising:
   receiving, at a thin-client terminal system, analog video component signals and digital video synchronization data, the digital video synchronization data being transmitted by a server system to the thin-client terminal system using a first line of a multi-conductor cable, the analog video component signals being transmitted by the server system to the thin-client terminal system using a second line of the multi-conductor cable;

outputting video signals to an analog display device communicatively connected to the thin-client terminal system, the video signals including the analog video component signals and the digital video synchronization data;

receiving, from a first serial interface component of the thin-client terminal system, first input data encoded in a first serial interface encoding format, the first serial interface component connected to a first input device;

transcoding the first input data into a second serial interface encoding format; and during a blanking interval on the analog display device displaying the video signals, transmitting the transcoded first input data to the server system via the first line of the multi-conductor cable.

13. The method of claim 12, wherein the analog video component signals are received from a first set of three wires of the multi-conductor cable, a first wire of the first set of three wires corresponding to the second line, wherein ground signals corresponding to the analog video component signals are received from a second set of three wires of the multi-conductor cable, wherein power is received from a seventh wire on the multi-conductor cable, and wherein multiplexed data is received from an eighth wire of the multi-conductor cable, the eighth wire corresponding to the first line, the multiplexed data including the digital video synchronization data and audio output data.

14. The method of claim 13, wherein the analog video component signals, the power, and the multiplexed data are received during a blanking interval on a display of the thin-client terminal system.

15. The method of claim 14, wherein the analog video component signals, the power, and the multiplexed data are received from the multi-conductor cable after a falling edge of a HSYNC pulse.

16. The method of claim 12, wherein the first serial interface format is a Universal Serial Bus (USB) format, and wherein the second serial interface format is a Personal System/2 (PS/2) format.

17. The method of claim 12, wherein the multiplexed data includes an end of transmission bit sequence, wherein the transcoded user input data is transmitted to the server in response to receipt of the end of transmission bit sequence.

18. The method of claim 12, further comprising:
receiving audio input data from an input device;
sampling the audio input data;
multiplexing the sampled audio input data with the transcoded user input data; and
transmitting the multiplexed input data to the server via the first line of the multi-conductor cable.

19. The method of claim 12, further comprising:
receiving, from a second serial interface component of the thin-client terminal system, second input data encoded in the first serial interface encoding format, the second serial interface component connected to a second input device;
transcoding the second input data into a second serial interface encoding format; and
during the blanking interval on the analog display device displaying the video signals, transmitting the transcoded second input data to the server system via the first line of the multi-conductor cable.

20. The method of claim 12, wherein outputting the video signals includes sending the analog video component signals from the server system directly to the analog display device.

21. A non-transitory machine-readable storage medium storing a set of instructions that, when executed by a processor, causes the processor to perform operations, comprising:
receiving, at a thin-client terminal system, analog video component signals and digital video synchronization data, the digital video synchronization data being transmitted by a server system to the thin-client terminal system on a first line of a multi-conductor cable, the analog video component signals being transmitted by the server system to the thin-client terminal system on a second line of the multi-conductor cable;

outputting video signals to an analog display device communicatively connected to the thin-client terminal system, the video signals including the analog video component signals and the digital video synchronization data;

receiving first input data encoded in a first serial interface encoding format;

transcoding the first input data into a second serial interface encoding format; and during a blanking interval on the analog display device displaying the video signals, transmitting the transcoded first input data to the server system via first line of the multi-conductor cable.

22. The non-transitory machine-readable storage medium of claim 21, wherein the analog video component signals are received from a first set of three wires of the multi-conductor cable, a first wire of the first set of three wires corresponding to the second line, wherein ground signals corresponding to the analog video component signals are received from a second set of three wires of the multi-conductor cable, wherein power is received from a seventh wire on the multi-conductor cable, and wherein multiplexed data is received from an eighth wire of the multi-conductor cable, the eighth wire corresponding to the first line, the multiplexed data including the digital video synchronization data and audio output data.

23. The non-transitory machine-readable storage medium of claim 22, wherein the multiplexed data are received during a blanking interval on the analog display device of the thin-client terminal system.

24. The non-transitory machine-readable storage medium of claim 23, wherein the multiplexed data are received from the multi-conductor cable after a falling edge of a HSYNC pulse.

25. The non-transitory machine-readable storage medium of claim 21, wherein the first serial interface format is a Universal Serial Bus (USB) format, and wherein the second serial interface format is a Personal System/2 (PS/2) format.

26. The non-transitory machine-readable storage medium of claim 21, wherein the multiplexed data includes an end of transmission bit sequence, wherein the transcoded input data is transmitted to the server in response to receipt of the end of transmission bit sequence.

27. The non-transitory machine-readable storage medium of claim 21, further comprising a further set of instructions that, when executed by the processor, causes the processor to perform further operations, comprising:
receiving audio input data from an input device;
sampling the audio input data;
multiplexing the sampled audio input data with the transcoded user input data; and
transmitting the multiplexed input data to the server via the first line of the multi-conductor cable.

28. The non-transitory machine-readable storage medium of claim 21, further comprising:
receiving, from a second serial interface component of the thin-client terminal system, second input data encoded in the first serial interface encoding format, the second serial interface component connected to a second input device;

transcoding the second input data into a second serial interface encoding format; and during the blanking interval on the analog display device displaying the video signal, transmitting the transcoded second input data to the server system via the first line of the multi-conductor cable.

29. The non-transitory machine-readable storage medium of claim 21, wherein outputting the video signals includes sending the analog video component signals from the server system directly to the analog display device.

* * * * *